United States Patent
Leffler et al.

(10) Patent No.: US 12,359,856 B2
(45) Date of Patent: Jul. 15, 2025

(54) SYSTEM AND METHOD FOR DETECTION OF REFRIGERANT LEAKS

(71) Applicant: Axiom Cloud Inc., San Jose, CA (US)

(72) Inventors: Robert Leffler, Portland, ME (US); Nikhil Saralkar, Bala Cynwyd, PA (US)

(73) Assignee: Axiom Cloud Inc., San Jose, CA (US)

( * ) Notice: Subject to any disclaimer, the term of this patent is extended or adjusted under 35 U.S.C. 154(b) by 0 days.

(21) Appl. No.: 18/426,270

(22) Filed: Jan. 29, 2024

(65) Prior Publication Data
US 2025/0044004 A1    Feb. 6, 2025

Related U.S. Application Data

(63) Continuation-in-part of application No. 18/363,402, filed on Aug. 1, 2023, now abandoned.

(51) Int. Cl.
*G06F 30/20*    (2020.01)
*F25B 49/00*    (2006.01)
*G06F 113/08*   (2020.01)

(52) U.S. Cl.
CPC ............ *F25B 49/005* (2013.01); *G06F 30/20* (2020.01); *F25B 2500/222* (2013.01);
(Continued)

(58) Field of Classification Search
CPC .............. F25B 49/005; F25B 2500/222; F25B 2700/04; F25B 2700/19; G06F 30/20; G06F 2113/08
(Continued)

(56) References Cited

U.S. PATENT DOCUMENTS

| | | | |
|---|---|---|---|
| 9,999,160 B1 * | 6/2018 | Dariavach | H05K 7/20709 |
| 2006/0179854 A1 * | 8/2006 | Esslinger | F25B 49/005 62/149 |

(Continued)

FOREIGN PATENT DOCUMENTS

| | | | | |
|---|---|---|---|---|
| GB | 2258047 A | * | 1/1993 | B60H 1/00978 |

OTHER PUBLICATIONS

Wan, H., Cao, T., Hwang, Y., Chang, S.D. and Yoon, Y.J., 2021. Machine-learning-based compressor models: A case study for variable refrigerant flow systems. International Journal of Refrigeration, 123, pp. 23-33. (Year: 2021).*

(Continued)

*Primary Examiner* — John E Johansen
(74) *Attorney, Agent, or Firm* — Run8 Patent Group, LLC; Peter Miller; Leah Raddatz

(57) ABSTRACT

A method includes, accessing a first fill level timeseries generated by a first refrigeration system; detecting a first reduction in refrigerant fill level in the first refrigeration system; correlating the first reduction in refrigerant fill level with a first refrigerant; accessing a first discharge pressure timeseries; deriving a first correlation between a first leak-prediction characteristic of the first discharge pressure timeseries and the first refrigerant leak; accessing a discharge pressure timeseries generated by a second refrigeration system; in response to detecting presence of the first leak-prediction characteristic in the third discharge pressure timeseries, predicting a second refrigerant leak in the second refrigeration system; generating a notification identifying the second refrigerant leak in the second refrigeration system; and serving the electronic notification to an operator associated with the second refrigeration system.

19 Claims, 5 Drawing Sheets

(52) U.S. Cl.
CPC ....... *F25B 2700/04* (2013.01); *F25B 2700/19* (2013.01); *G06F 2113/08* (2020.01)

(58) Field of Classification Search
USPC ............................................................ 703/7
See application file for complete search history.

(56) References Cited

U.S. PATENT DOCUMENTS

| | | | |
|---|---|---|---|
| 2014/0266765 A1* | 9/2014 | Neeley ..................... | H04N 5/33 |
| | | | 702/183 |
| 2015/0007591 A1* | 1/2015 | Liu ........................ | F25B 49/005 |
| | | | 62/77 |
| 2018/0195748 A1* | 7/2018 | Sinha ....................... | F24F 11/62 |
| 2019/0072320 A1* | 3/2019 | Devi ..................... | F25D 29/008 |
| 2020/0248919 A1* | 8/2020 | Green .................. | G05B 23/027 |
| 2021/0088247 A1* | 3/2021 | Kriss ........................ | H04Q 9/00 |
| 2021/0222904 A1* | 7/2021 | Kim ........................ | F24F 11/56 |
| 2021/0389007 A1* | 12/2021 | Chan ........................ | F24F 11/38 |

OTHER PUBLICATIONS

Alonso et al. "A deep learning approach for fusing sensor data from screw compressors." Sensors 19.13 (2019): 2868. Retrieved on Sep. 29, 2024 (Sep. 29, 2024) from entire document.

Bohorquez et al. "Leak detection and topology identification in pipelines using fluid transients and artificial neural networks." Journal of Water Resources Planning and Management 146.6 (2020): 04020040. Retrieved on Sep. 29, 2024 (Sep. 29, 2024) from entire document.

International Search Reported received in PCT/US24/40405 dated Oct. 10, 2024.

* cited by examiner

S150

| REFRIGERATION SYSTEM VIEWER | | | | | ✕ |
|---|---|---|---|---|---|
| USER PORTAL | | | | | |
| OVERVIEW | NOTIFICATIONS | | | | |
| RANK | SYSTEM | LOCATION | LEAK? | CONFIDENCE | URGENCY |
| 1 | A | SUNNYVALE, CA | YES | 80% | LOW |
| 2 | B | MT VIEW, CA | YES | 70% | HIGH |
| 3 | C | PALO ALTO, CA | YES | 15% | LOW |
| 4 | D | SAN JOSE, CA | NO | 90% | NA |
| 5 | E | DALY CITY, CA | NO | 60% | NA |

REFRIGERATION SYSTEM VIEWER ✕

USER PORTAL

OVERVIEW | NOTIFICATIONS

SYSTEM

A
- LEAK DETECTED, SLOW LEAK @ COMPRESSOR 2
- TIME TO LOSS OF FUNCTION: 262 DAYS
- COST OF REFIGERANT LOST: $6.42 / DAY

[MORE INFO] [DISMISS?] [SCHEDULE MAINTENANCE]

B
- LEAK DETECTED, FAST LEAK @ VALVE 7
- TIME TO LOSS OF FUNCTION: 18 DAYS
- COST OF REFIGERANT LOSS: $43.29 / DAY

[INFO] [DISMISS] [SCHEDULE MAINTENANCE]

*FIGURE 2B*

SYSTEM AND METHOD FOR DETECTION OF REFRIGERANT LEAKS

CROSS-REFERENCE TO RELATED APPLICATIONS

This application is a continuation-in-part of U.S. patent application Ser. No. 18/363,402 filed on 1 Aug. 2023 which is incorporated in its entirety by this reference.

TECHNICAL FIELD

This invention relates generally to the field of refrigeration systems and more specifically to a new and useful method of detecting refrigerant leaks in refrigeration systems.

BRIEF DESCRIPTION OF THE FIGURES

FIG. 2A is a representation of one variation of the system;
FIG. 2B is a representation of one variation of the system.

DESCRIPTION OF THE EMBODIMENTS

Figure 1:
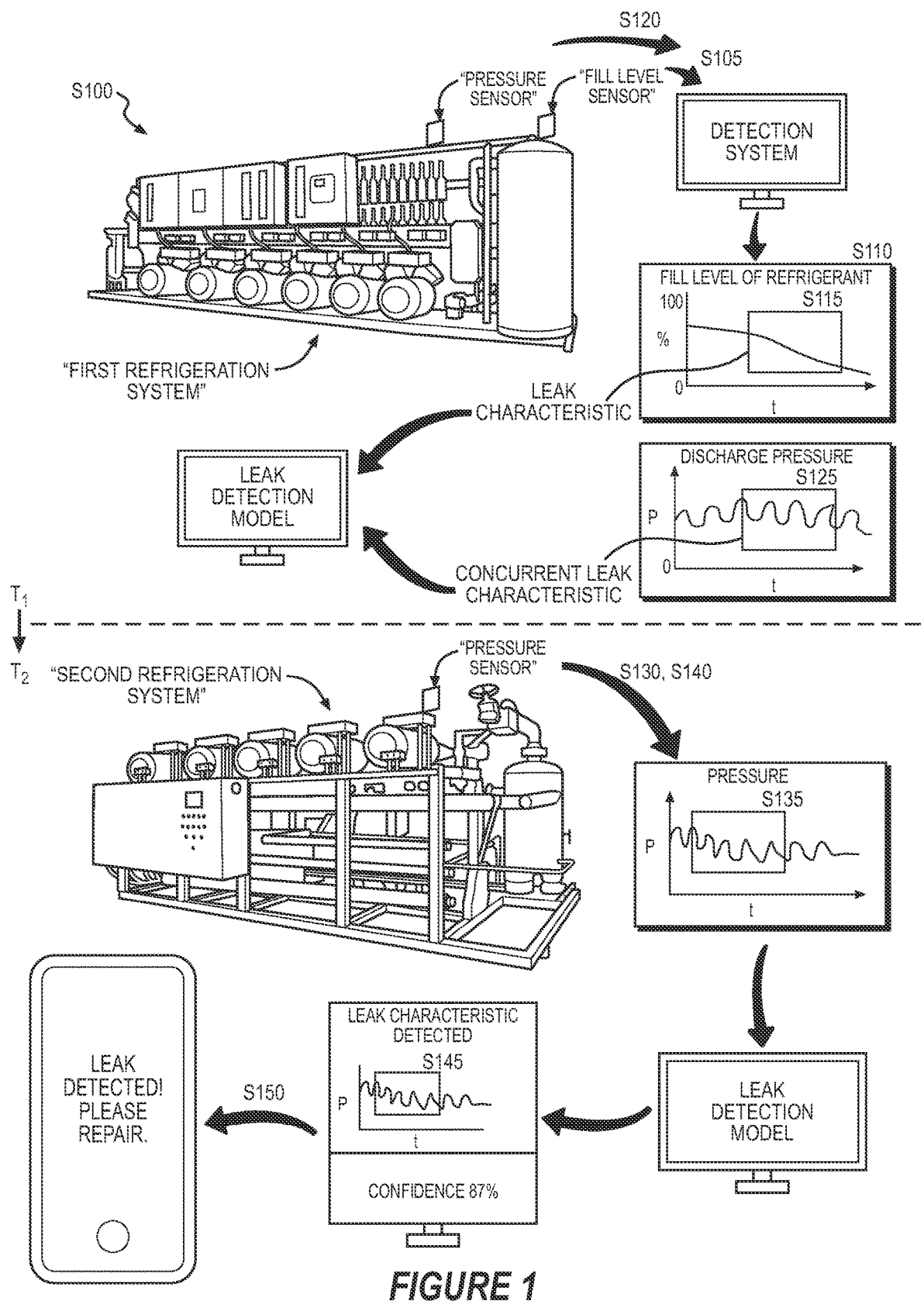
FIG. 1 is a representation of one variation of the system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHOD

As shown in FIGS. 1, 2A, 2B, 2C, and 3, the method S100 includes, during a first time period: accessing a first fill level timeseries generated by a first refrigeration system including a fill level sensor configured to output a signal representing a fill level of a refrigerant receiver in Block S105; detecting a first reduction in refrigerant fill level in the first refrigeration system, during a first time window, based on the first fill level timeseries in Block S110; correlating the first reduction in refrigerant fill level with a first refrigerant leak in the first refrigeration system in Block S115; accessing a first discharge pressure timeseries generated by a pressure sensor of the first refrigeration system and concurrent with the first time window in Block S120; and identifying a first leak-prediction characteristic of the first discharge pressure timeseries correlated with the first refrigerant leak in Block S125.

The method S100 includes, during a second time period succeeding the first time period: accessing a second discharge pressure timeseries generated by a second refrigeration system excluding a fill level sensor during a second time window in Block S130; and, in response to detecting absence of the leak-prediction characteristic in the second discharge pressure timeseries, predicting absence of refrigerant leaks in the second refrigeration system during the second time window in Block S135.

During a third time period succeeding the first time period, the method S100 further includes: accessing a third discharge pressure timeseries generated by the second refrigeration system during a third time window Block S140; in response to detecting presence of the leak-prediction characteristic in the third discharge pressure timeseries predicting a second refrigerant leak in the second refrigeration system during the third time window in Block S145; generating an electronic notification identifying the second refrigerant leak in the second refrigeration system; and serving the electronic notification to an operator associated with the second refrigeration system in Block S150.

1.1 Variation: Multiple Sensor Types

In one variation, the system executes the method S100 based on data accessed from two types of sensors including: a first sensor type-included in the first refrigeration system and excluded in the second refrigeration system-outputting a signal correlated to a refrigerant leak; and a second sensor type-included in both the first and second refrigeration system.

This variation of the method S100 includes, during a first time period: accessing a first timeseries generated by a first sensor of a first refrigeration system defining a first sensor type in Block S105; detecting a first change in the first refrigeration system, during a first time window, based on the first timeseries in Block S110; correlating the first change in the first refrigeration system with a first refrigerant leak in the first refrigeration system in Block S115; accessing a second timeseries generated by a second sensor of the first refrigeration system concurrent with the first time window, the second sensor defining a second sensor type in Block S120; and deriving a correlation between a leak-prediction characteristic of the second timeseries and the first refrigerant leak in Block S125.

This variation of the method S100 includes, during a second time period succeeding the first time period: accessing a third timeseries, generated by a third sensor, defining the second sensor type of a second refrigeration system during a second time window, the second refrigeration system excluding the first sensor type in Block S130; and, in response to detecting absence of the leak-prediction characteristic in the third timeseries, predicting absence of refrigerant leaks in the second refrigeration system during the second time window in Block S135.

This variation of the method S100 further includes, during a third time period succeeding the first time period: accessing a fourth timeseries, generated by the third sensor, defining the second sensor type of the second refrigeration system during a third time window in Block S140; in response to detecting presence of the leak-prediction characteristic in the fourth timeseries, predicting a second refrigerant leak in the second refrigeration system during the third time window in Block S145; generating an electronic notification identifying the second refrigerant leak in the second refrigeration system; and serving the electronic notification to an operator associated with the second refrigeration system in Block S150.

1.2 Variation: Presence of Leak

In one variation, the method S100 includes, during a first time period: accessing a first fill level timeseries generated by a first refrigeration system including a fill level sensor configured to output a signal representing a fill level of a refrigerant receiver in Block S105; detecting a first reduction in refrigerant fill level in the first refrigeration system, during a first time window, based on the first fill level timeseries in Block S110; correlating the first reduction in refrigerant fill level with a first refrigerant leak in the first refrigeration system in Block S115; accessing a first discharge pressure timeseries generated by a pressure sensor of the first refrigeration system and concurrent with the first time window in Block S120; and deriving a first correlation between a leak-prediction characteristic of the first discharge pressure timeseries and the first refrigerant leak in Block S125.

During a second time period succeeding the first time period, this variation of the method includes: accessing a second discharge pressure timeseries generated by a second refrigeration system excluding a fill level sensor during a second time window in Block S140; in response to detecting presence of the leak-prediction characteristic in the second discharge pressure timeseries, predicting a second refrigerant leak in the second refrigeration system during the second time window in Block S145; generating an electronic notification identifying the second refrigerant leak in the second refrigeration system; and serving the electronic notification to an operator associated with the second refrigeration system in Block S150.

2. APPLICATIONS

Generally, the system executes the Blocks of the method S100 to: derive a correlation between a refrigerant leak and a timeseries of sensor data of a refrigeration system; and, in response to detecting a timeseries of sensor data correlated to a refrigerant leak, notify a stakeholder (e.g., an operator, owner, etc.) operator of the refrigeration system.

In one implementation, the system described herein can execute the method S100 to detect leaks in industrial and commercial refrigeration systems including: a central refrigerant receiver; several (e.g., tens, dozens) refrigerated volumes; a compressor for each refrigerated volume (or group of refrigerated volumes); and hundreds or thousands of feet of piping connecting each compressor and refrigerated volume to the central refrigerant receiver. A leak can occur in any one of these components including along piping embedded within floors and walls. Therefore, detecting and finding the leak is a labor intensive and costly process. As a result, leaks in large refrigeration systems, such as those in grocery stores, go undetected for months at a time. Furthermore, commonly used refrigerants in these refrigeration systems (e.g., R-134A, R404A, R714, R717, etc.) include hydrofluorocarbons (HFCs) and hydrofluoroolefins (HFOs) that are 10,000+ times more potent greenhouse gases than carbon dioxide or methane, thereby contributing significantly to the runaway greenhouse effect in Earth's atmosphere.

The system described herein is configured to execute the Method S100 to detect refrigerant leaks within days or weeks of incidence, thereby decreasing an amount of refrigerant leaked into the environment and decreasing the environmental impact of refrigeration systems.

2.1 Training Based on Fill Level Data

The method S100 includes: accessing a first fill level timeseries from the first refrigeration system; detecting a reduction in refrigerant fill level in the first refrigeration system; correlating the first reduction in refrigerant fill level with a first refrigerant leak; accessing a first discharge pressure timeseries; and identifying a first leak-prediction characteristic correlated with the first refrigerant leak.

The system can: derive correlations from changes in other characteristics of a refrigeration system and its operation; repeat this process to derive correlations for other refrigeration systems in a population of refrigeration system with fill level sensors; and compile these correlations into a model that associates leak-prediction characteristics with refrigerant leaks. For example, the system can: construct a template database of refrigeration system operational characteristics over time; and label the template database with leak characteristics including whether a leak is present, a rate of the leak, a time until the refrigerant receiver is emptied of refrigerant, and a time until a refrigerated volume of the refrigeration system exceeds a set temperature.

In one implementation, the system can: generate a set of vectors representing refrigeration system operational characteristics over time; label the vectors with leak characteristics; and train a neural network on the set of vectors to predict leak characteristics based on one or more refrigeration system operational characteristics over time. The system can further train the neural network to: output a confidence score representing an accuracy of the predicted leak characteristic; and output an urgency score indicating how quickly a refrigerant leak should be addressed to minimize environmental impact, repair cost, and/or food loss.

Therefore the system can compile data from a small population of refrigeration systems with fill level sensors to construct a model that detects or predicts leaks in refrigeration systems lacking fill level sensors.

2.2 Leak Detection in Alternate Refrigeration System Population

The method S100 further includes: accessing a discharge pressure timeseries generated by the second refrigeration system; and detecting presence of the leak-prediction characteristic in the discharge pressure timeseries predicting a refrigerant leak in the second refrigeration system lacking a fill level sensor.

The system can thereby: access timeseries data from a refrigeration system lacking a fill level sensor; input the timeseries data into a model correlating sensor data to refrigerant leaks; derive a predicted leak characteristic; and transmit a notification to an operator of the refrigeration system indicating need for repair or replacement of a component exhibiting a refrigerant leak. Therefore, the system detects leaks in a refrigeration system lacking a fill level sensor, lacking a refrigerant gas sensor (or "sniffer"), and prior to loss of cooling capacity of the refrigeration system.

2.3 Confidence and Urgency

The system can further: calculate a confidence score of a presence of a leak; and calculate an urgency of repairing a leak. For example, the system can derive a confidence score representing a likelihood that the sensor data from the refrigeration system is correlated to a refrigerant leak. Further, the system can establish a threshold confidence score at which the system transmits a notification to an operator of the refrigeration system indicating a leak. Therefore, the system is configured to: notify operators of leaks corresponding to a high confidence score (e.g., above the threshold confidence score); and capture additional sensor data before notifying operators of a leak corresponding to a confidence score below the threshold confidence score.

The system can additionally derive an urgency for each refrigerant leak detected by the system. In one implementation, the system derives an urgency based on a predicted time of system failure (e.g., loss of cooling capability) of the refrigeration system. For example, the system can derive a predicted time the refrigerant receiver is emptied of refrigerant. In another implementation the state derives the urgency of a refrigerant leak based on a predicted financial impact of the leak. For example, the system can: calculate a cost of refrigerant leaked per day; calculate a loss of revenue due to decreased reliability of the refrigeration system; and derive an urgency based on those factors. Therefore, the system can: derive an urgency of each refrigerant leak; rank a set of refrigerant leaks of different refrigeration systems managed by the same operator; and display the ranked set of refrigerant leaks to the operator to enable the operator to prioritize maintenance of highest urgency refrigerant leaks.

2.4 User Interface

The system: outputs notifications indicating a refrigerant leak to a computing device of an operator of a refrigeration system; and hosts a user portal accessible via a computing device of an operator including additional information about the refrigerant leak.

Figure 2C:
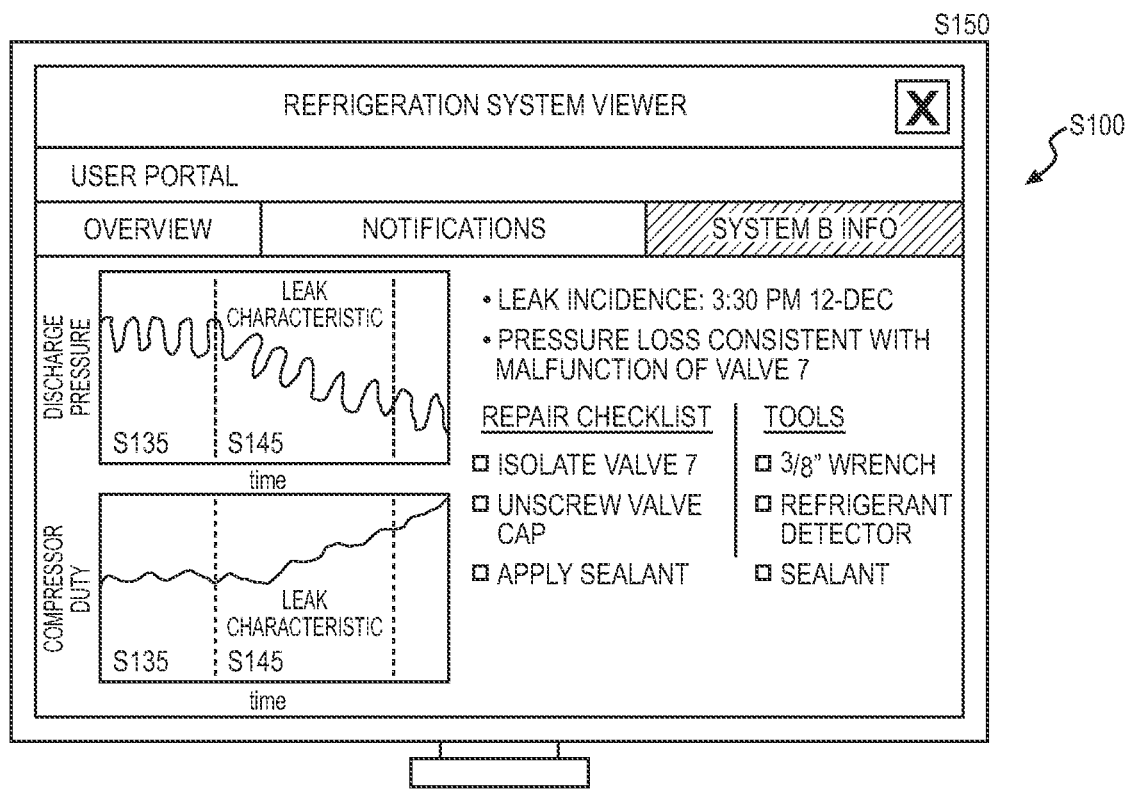
FIG. 2C is a representation of one variation of the system.
Figure 3:
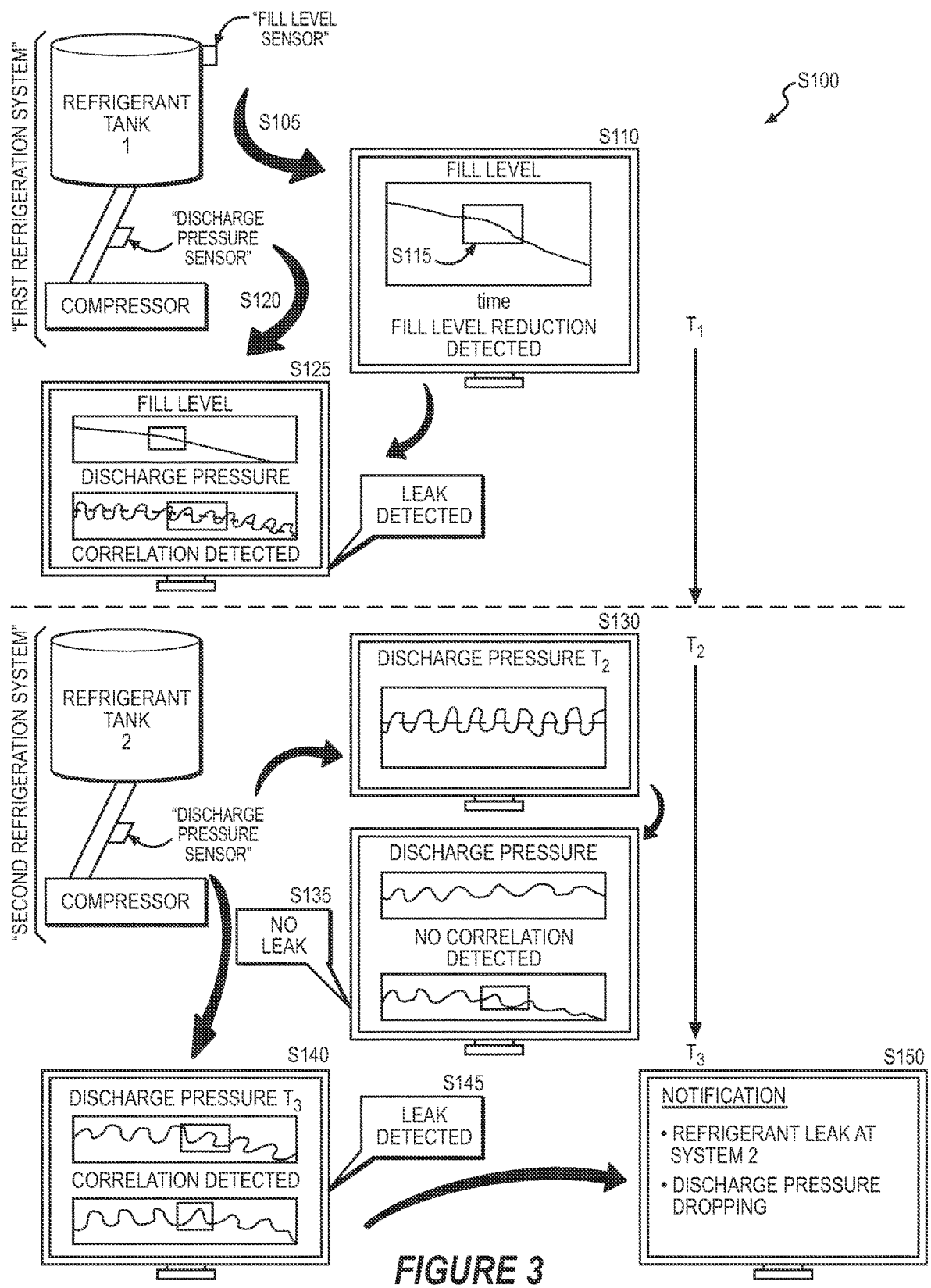
FIG. 3 is a representation of one variation of the system.

For example, the system can derive and display information for each refrigeration system managed by an operator such as: leak indications, likelihood of a future leak, repair/maintenance schedules; predicted cost of repair; and location of the refrigerant leak. In one implementation, the system can further: generate a repair checklist for a refrigerant leak indicating a set of steps to mitigate the refrigerant leak and a set of tools necessary to complete the repair, as shown in FIG. 2C. Therefore the system assists operators of refrigeration systems to: promptly handle refrigerant leaks; and proactively maintain their refrigeration systems to prevent refrigerant leaks.

2.5 Leak Management Across Refrigeration System Population

In one implementation, the system can: access timeseries pressure data from a refrigeration system; compile the timeseries pressure data into a chart representing pressure versus time; annotate the chart with a time at which a change in pressure indicates a refrigerant leak; and repeat this process for other sensor data received from the refrigeration system. The system can then access non-sensor data from the refrigeration system including a location, a case type (e.g., open front or closed front), an internal volume, a refrigerant type, a make and/or model, and a set temperature. The system can then calculate: a rate of pressure change based on the timeseries of pressure data; a correlation of the rate of pressure change to a leak rate; a time until the refrigeration system runs out of refrigerant; a time until the internal volume of the refrigeration system exceeds the set temperature; and an environmental impact of the refrigerant leak. The system can calculate a priority score based on: the time until the refrigeration system runs out of refrigerant; the time until the internal volume of the refrigeration system exceeds the set temperature; and the environmental impact of the refrigerant leak.

In one implementation, the system can then: render charts (e.g., sensor data timeseries over time) for the refrigeration system in the user portal; repeat the process above for a population of refrigeration systems (e.g., a set of refrigeration systems within one building, located on one campus, or associated with/owned by a single organization); rank refrigeration systems in population by the leak rate, the predicted time a refrigerant receiver of the refrigeration system is empty, and the environmental impact; and generate a table representing all refrigeration systems, including refrigeration system characteristics and derived leakage-related data, the table sortable by the priority score and other parameters.

3. REFRIGERATION SYSTEM

In one implementation, the system described herein is configured to detect refrigerant leaks for large scale refrigeration systems, such as those used in supermarkets. A refrigeration system can include: a refrigerant receiver a compressor; a condenser; an expansion device; an evaporator; and a refrigerated volume. The refrigerant receiver stores a volume of refrigerant for use throughout the refrigeration system. The compressor can increase a pressure within the refrigeration system, such as to raise the temperature of the refrigerant. The condenser enables hot refrigerant to cool and exchange heat with the ambient environment, thereby cooling the refrigerated volume and changing the refrigerant to a liquid. The expansion device reduces the pressure of liquid refrigerant, which changes to a very cold liquid/vapor mix. The evaporator turns liquid refrigerant back into a vapor by increasing a temperature and pressure of the refrigerant.

The refrigeration system: directs a flow of refrigerant (e.g., R134A) from the refrigerant receiver to the compressor; activates the compressor to increase pressure exerted on the refrigerant, thereby increasing a temperature of the refrigerant; directs the hot refrigerant to a condenser to reject heat to the ambient environment; directs the cooled, liquid refrigerant to the evaporator proximal the refrigerated volume to absorb heat from the refrigerated volume; and recycles the refrigerant to the compressor.

The system described herein is additionally configured to execute the Blocks of the method S100 to detect a leak in any other type of refrigeration system including but not limited to supermarket refrigeration systems.

4. SENSOR DATA ACCESS

The system can: access a set of data from the refrigeration system in Block S105 by integrating with a controller of the refrigeration system to all data streams related to the refrigeration system including the outputs of all sensors of the refrigeration system.

4.1 Data Streams

The system can access sensor data output by sensors of a refrigeration system. For example, the system can access the output of a pressure sensor located on an output line from the refrigerant receiver to a condenser; and derive a discharge pressure of the refrigeration system based on the output of the pressure sensor.

In one implementation, the system can access data of the refrigeration system. For example, the system can access: set temperatures for each refrigeration volume; and actual temperatures within each refrigeration volume. The system can therefore monitor a difference between the set temperature and actual temperature of a refrigeration volume.

In one implementation, the system can access hardware information of the refrigeration system. For example, the system can: access a make and model of the refrigeration system; identify a schematic of the refrigeration system based on the make and model; and predict a rate of refrigerant use based on the schematic.

In one implementation, the system can: access a location of a refrigeration system; access an outdoor temperature of the location; and predict a rate of refrigerant usage based on the outdoor temperature at the location.

The system can further access refrigeration system information including but not limited to: a power consumption of the refrigeration system; a usage schedule (e.g., hours when a door to a refrigeration volume opened most frequently, such as during a stocking event); ambient indoor conditions proximal the refrigeration system; and a type of food stored. The system can therefore monitor and process each of the above data streams to detect refrigerant leaks and identify similar refrigeration systems indicating refrigerant leaks.

5. DETECTING LEAKS

In one implementation, the system can: detect a first reduction in refrigerant fill level in the first refrigeration system in Block S110; and correlate the first reduction in refrigerant fill level with a first refrigerant leak in the first refrigeration system in Blocks S110 and S115.

In one implementation, the system detects a first reduction in refrigerant fill level and defines a characteristic of the timeseries of refrigerant fill level. For example, the system can derive a slope of the refrigerant fill level timeseries to characterize the refrigerant fill level data.

In one implementation, during a first time period, the system detects a refrigerant leak based on a timeseries of fill level data of the refrigerant receiver. For a refrigeration system exhibiting nominal operation (e.g., lacking a refrigerant leak) the system can: predict a nominal refrigerant level variations based on a set temperature of the refrigeration volume, a compressor type, and an ambient temperature proximal the refrigeration system; and predict variations in the rate of refrigerant loss caused by known factors such as seasonality, pooling of refrigerant within the refrigeration system, and a schedule of refrigeration system usage.

The system can further: access a timeseries of refrigerant fill level data from the refrigeration system; compare the predicted nominal rate of refrigerant loss to the timeseries; and detect a refrigerant leak based on a difference between the nominal refrigerant loss rate and the timeseries.

Therefore, for a refrigeration system including a refrigerant fill level sensor, the system can monitor a timeseries of refrigerant fill level data to detect a refrigerant leak in the refrigeration system.

5.1 Data Storage

In one implementation, the system can upload accessed refrigeration system data to a remote computer system (e.g., a server) for storage. The system can then: store the data to a circular buffer configured to retain data captured within a multi-week time period and discard data captured before the multi-week time period; process the data to detect a refrigerant leak; and, in response to detecting a leak, retrieve relevant data from the circular buffer, extract a leak-prediction characteristic from the data, and derive a correlation between the leak-prediction characteristic and the refrigerant leak.

In one implementation the remote computer system writes discharge pressures, streamed from the first refrigeration system to a circular buffer spanning a time duration of multiple weeks. In response to correlating the first reduction in refrigerant fill level with the first refrigerant leak in the first refrigeration system, the remote computer system: detects a first leak start time of the first refrigerant leak based on the first fill level timeseries; retrieves the first discharge pressure timeseries from the circular buffer; identifies a segment of the first discharge pressure timeseries including discharge pressures recorded proximal the first leak start time; and extracts a leak-prediction characteristic from the segment of the first discharge pressure timeseries. In this implementation, the system identifies the first leak-prediction characteristic by identifying the first leak-prediction characteristic of the first discharge pressure timeseries temporally correlated with the first refrigerant leak based on the first leak start time and discharge pressures recorded proximal the first leak start time.

6. DETECTING CORRELATIONS

In one implementation, the system can: access a discharge pressure timeseries generated by a pressure sensor of the first refrigeration system and concurrent with the first time window in Block S120; and derive a first correlation between a leak-prediction characteristic of the first discharge pressure timeseries and the first refrigerant leak in Block S125.

The system derives the first correlation by: identifying a segment of the discharge pressure timeseries concurrent with an incidence time of the refrigerant leak; identifying a characteristic of the discharge pressure timeseries within the segment; comparing the characteristic of the discharge pressure timeseries to a nominal (e.g., no leak) discharge pressure timeseries; and, in response to detecting a difference between the characteristic of the discharge pressure timeseries and the nominal characteristic, defining the characteristic as a leak-prediction characteristic.

For example, the system can: detect a reduction in the refrigerant fill level non-consistent with nominal refrigeration system operation occurring at 3 pm on a Monday; select a segment of the discharge pressure timeseries including discharge pressure data at 3 pm on Monday; compare the segment of the discharge pressure timeseries to a previous discharge pressure timeseries, such as a discharge pressure timeseries from the previous day; and, in response to a difference or a leak-prediction characteristic present (e.g., an increasing or decreasing trajectory of the discharge pressure) between the discharge pressure of the segment and the previous discharge pressure timeseries, correlate the discharge pressure timeseries with the refrigerant leak. The system can then store, to a database or multi-dimensional vector space of leak-prediction characteristic, the leak-prediction characteristic including the segment of discharge pressure timeseries data within a vector including the concurrent refrigerant fill level timeseries and a leak indication.

In one implementation, the system can derive a correlation between a leak-prediction characteristic of any other sensor data from the first refrigeration system and the first refrigerant leak. For example, the system can execute the process described above on a data stream captured from a compressor representing a duty cycle of the compressor or a power consumption of the compressor. The system can: segment a timeseries of compressor duty cycle data; detect a change in that segment compared to nominal operation; define the change as a leak-prediction characteristic; and store the segment of compressor duty cycle timeseries data to the vector including the segment of discharge pressure timeseries data. Therefore, the system can: derive correlations for multiple data streams representing multiple sensor and data types within the refrigeration system; and store those correlations with a leak indication (e.g., a binary value "1" indicating presence of a leak in the refrigeration system).

The system can further derive a function defining a relationship between the timeseries of sensor data and the refrigerant leak. For example, the system can detect, during a refrigerant leak, that the compressor duty increased 1% for each 1% volume of refrigerant lost.

The system can then repeat this process on other refrigeration systems to generate correlations between refrigerant leaks and data streams from the other refrigeration systems. For example, the system can: access a third fill level timeseries generated by a third refrigeration system including a fill level sensor; detect a third reduction in refrigerant fill level in the third refrigeration system, during a fourth time window, based on the third fill level timeseries; correlate the third reduction in refrigerant fill level with a third refrigerant leak in the third refrigeration system; access a third discharge pressure timeseries generated by a pressure sensor of the third refrigeration system and concurrent with the fourth time window; derive a third correlation between a third leak-prediction characteristic of the third discharge pressure timeseries and the third refrigerant leak; and generate a composite correlation including correlations from the first refrigeration system and the third refrigeration system. The system can therefore: derive composite correlations for multiple refrigeration systems exhibiting leaks to expand a database and/or multi-dimensional vector space of data correlations to refrigerant leaks; and detect a refrigerant leak of another refrigeration system based on the composite correlation.

6.1 Deriving Correlations in a Vector Space

Figure 4:
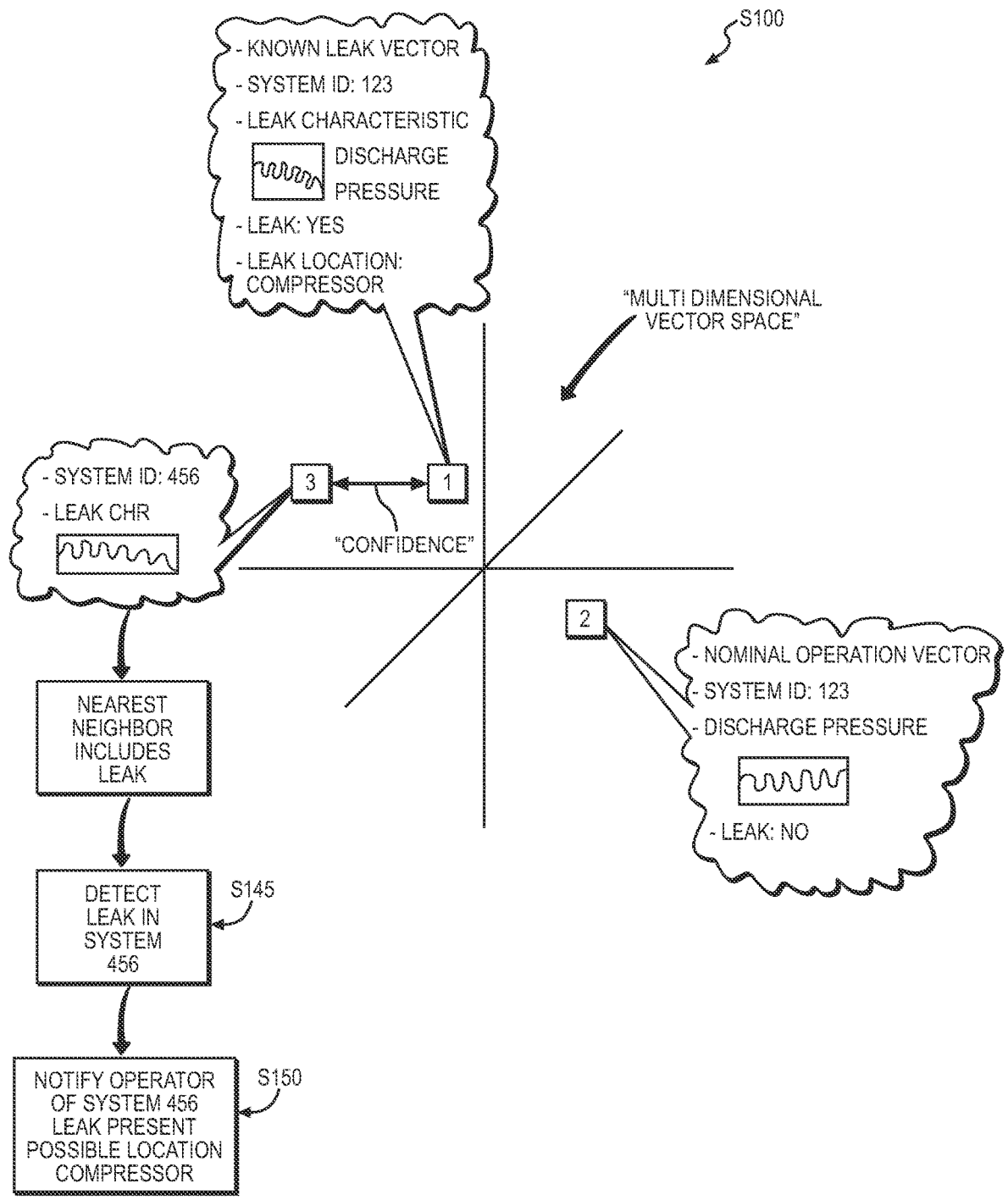
FIG. 4 is a representation of one variation of the system.

In one implementation shown in FIG. 4, the system can: store a leak-prediction characteristic correlated to a refrigerant leak to a leak vector; populate a multi-dimensional vector space with the leak vector; and detect a refrigerant leak based on a location of the vector within the multi-dimensional vector space relative to other vectors.

The system can further: store nominal timeseries data (e.g., not correlated to a refrigerant leak) within a nominal vector; and populate the multi-dimensional vector space with the nominal vector. Therefore, the multi-dimensional vector space includes leak vectors corresponding to refrigerant leaks and nominal vectors corresponding to nominal operation of a refrigeration system.

The system can define the multi-dimensional vector space including a dimension for each vector component. For example, the system can define a set of vectors defining: a binary leak indication (e.g., "1" for leak detected and "0" for no leak detected); a segment of timeseries data from a sensor of the refrigeration system; and an identifier of a type of the sensor. The system therefore defines a multi-dimensional vector space including a dimension (e.g., an axis) for each component of the vector including the leak indication, the timeseries, and the sensor type.

The system can further define each vector in the multi-dimensional vector space to include refrigeration system information including: a geographic region; a manufacturer; a model; a condition (e.g., damage or previous leaks); a use schedule (e.g., hours of operation of a grocery store housing the refrigeration system); and a maintenance history (e.g., when refrigerant receiver last filled).

For a first refrigeration system including a refrigerant fill level sensor, the system can: detect a leak based on a timeseries of refrigerant fill level data; identify an incidence time of the leak; access data streams from other sensors of the first refrigeration system (e.g., access pressure sensor data of the first refrigeration system to capture a discharge pressure timeseries); extract a timeseries of sensor data concurrent with the incidence time of the leak (e.g., including data for an interval of time before and after the incidence time); generate a vector including the timeseries of refrigerant fill level, timeseries of sensor data concurrent to the refrigerant leak, a leak indicator, and additional refrigeration system information; and populate the multi-dimensional vector space with the vector.

For example, for a first refrigeration system, the system can: access a timeseries of refrigerant fill level data; detect a 2% reduction in slope of a trend of the refrigerant fill level timeseries; detect a leak based on the 2% reduction in slope; access an incidence time of the reduction in slope; define a time interval including the incidence time; access a set of other timeseries of sensor data (e.g., pressure, temperature data etc.) concurrent with the time interval; store the refrigerant fill level timeseries, other concurrent timeseries data, and a leak indication within a vector; and populate the vector within the multi-dimensional vector space. Therefore, the system can populate the multi-dimensional vector space with ground truth vectors that correspond to a known leak in a first refrigeration system including a refrigerant fill level sensor.

Then, for a second refrigeration system (e.g., lacking a refrigerant fill level sensor), the system can execute Blocks of the method S100 to: capture timeseries data from sensors of a second refrigeration system (e.g., discharge pressure data); generate a second vector including the timeseries data from the second refrigeration system and second refrigeration system information; populate the second vector into the multi-dimensional vector space based on the components of the second vector; and detect a leak in the second refrigeration system based on a location of the second vector in the multi-dimensional vector space relative to other ground truth vectors within the multi-dimensional vector space.

In one implementation, the system derives correlations between timeseries data and a refrigerant leak via a nearest-neighbor algorithm. For example, the system: populates a vector including data from a second refrigeration system into the vector space; identifies a ground truth vector (e.g., a vector associated with a known leak) proximal the second vector; calculates a distance between the second vector and the ground truth vector in the multi-dimensional vector space; and updates a leak indication of the second vector based on the distance between the second vector and the ground truth vector. For example, if the second vector contains discharge pressure timeseries data approximating the discharge pressure timeseries data in the ground truth vector, then the system populates the second vector nearby the ground truth vector based on the similarity between the discharge pressure timeseries in both vectors. In response to the nearest vector to the second vector defining presence of a refrigerant leak, the system can update the second vector to include a leak indication defining presence of a refrigerant leak. Similarly, in response to the nearest vector to the second vector defining absence of a refrigerant leak, the system can update the second vector to include a leak indication defining absence of a refrigerant leak. Therefore, the system can identify similarities between vectors based on proximity of the vectors in the multi-dimensional vector space and detect presence of a leak in the second refrigeration system based on a previously detected leak in a different refrigeration system.

In one implementation, the system derives correlations between timeseries of data and a refrigerant leak by segmenting the multi-dimensional vector space into regions (e.g., multi-dimensional volumes) including a set of vectors (e.g., a cluster of vectors). For example, the system can: populate the second vector from the second refrigeration system into the multi-dimensional vector space based on the components of the second vector; identify a cluster of vectors proximal the second vector; and update the second vector to include a leak indication based on leak indications of the cluster of vectors proximal the second vector.

For example, the system can define a vector including a system characteristic, such as a refrigerant type. In this example, the system can: access a first system characteristic of the first refrigeration system defining a first refrigerant type; access a second system characteristic of the second refrigeration system defining the first refrigerant type; access a third system characteristic of the third refrigeration system defining a second refrigerant type; access a third fill level timeseries generated by a third refrigeration system including a fill level sensor; detect a third reduction in refrigerant fill level in the third refrigeration system, during a fourth time window, based on the third fill level timeseries; correlate the third reduction in refrigerant fill level with a third refrigerant leak in the third refrigeration system; access a third discharge pressure timeseries generated by a pressure sensor of the third refrigeration system and concurrent with the fourth time window; and derive a third correlation between a third leak-prediction characteristic of the third discharge pressure timeseries and the third refrigerant leak. In response to the first system characteristic defining the first refrigerant type to the second system characteristic defining the first refrigerant type. the system can detect presence of the leak-prediction characteristic in the third discharge pressure timeseries by searching the third discharge pressure timeseries for the leak-prediction characteristic. Therefore the system can define a correlation between refrigeration system sensor data within a vector and a refrigerant leak based on refrigeration system characteristics.

In another example, the system can define a vector including system location. In this example, the system can: access a first location of the first refrigeration system defining a first geographic region; access a second location of the second refrigeration system defining a second geographic region; access a third location of the third refrigeration system defining the second geographic region; access a third fill level timeseries generated by a third refrigeration system including a fill level sensor; detect a third reduction in refrigerant fill level in the third refrigeration system, during a fourth time window, based on the third fill level timeseries; correlate the third reduction in refrigerant fill level with a third refrigerant leak in the third refrigeration system; access a third discharge pressure timeseries generated by a pressure sensor of the third refrigeration system and concurrent with the fourth time window; and derive a third correlation between a third leak-prediction characteristic of the third discharge pressure timeseries and the third refrigerant leak. Then, the system can: in response to the second location of the second refrigeration system defining the second geographic region and the third location of the third refrigeration system defining the second geographic region, search the third discharge pressure timeseries for the third leak-prediction characteristic; and, in response to detecting presence of the third leak-prediction characteristic in the third discharge pressure timeseries, predict a second refrigerant leak approximating the third refrigerant leak in the second refrigeration system during the third time window. Therefore the system can define a correlation between refrigeration system sensor data within a vector and a refrigerant leak based on a geographic location of the refrigeration system and data from refrigeration systems in similar geographic locations.

In another example, the system can define a vector including system condition, such as a defect or damage. In this example the system can: access a first condition of the first refrigeration system defining a first defect; access a second condition of the second refrigeration system defining a second defect; access a third condition of the third refrigeration system defining the first defect; access a third fill level timeseries generated by a third refrigeration system including a fill level sensor; detect a third reduction in refrigerant fill level in the third refrigeration system, based on the third fill level timeseries; correlate the third reduction in refrigerant fill level with a third refrigerant leak in the third refrigeration system; access a third discharge pressure timeseries generated by a pressure sensor of the third refrigeration system and concurrent with the fourth time window; and derive a third correlation between a third leak-prediction characteristic of the third discharge pressure timeseries and the third refrigerant leak. The system can then: in response to the second condition defining the first defect and the first condition defining the first defect, search the third discharge pressure timeseries for the leak-prediction characteristic. Therefore the system can define a correlation between refrigeration system sensor data within a vector and a refrigerant leak based on a refrigeration system condition similar to a condition of other refrigeration systems.

In one implementation, the system: accesses first condition of the first refrigeration system defining a first internal volume; accesses a second condition of the second refrigeration system defining the first internal volume; accesses a third condition of the third refrigeration system defining a second internal volume; identifies the first leak-prediction characteristic of the first discharge pressure timeseries correlated with the first refrigerant leak, the first leak-prediction characteristic associated with the first interval volume; accesses a third fill level timeseries generated by the third refrigeration system including a fill level sensor; detects a third reduction in refrigerant fill level in the third refrigeration system, during a fourth time window, based on the third fill level timeseries; correlates the third reduction in refrigerant fill level with a third refrigerant leak in the third refrigeration system; accesses a third discharge pressure timeseries generated by a third pressure sensor of the third refrigeration system and concurrent with the fourth time window; and identifies a second leak-prediction characteristic of the third discharge pressure timeseries correlated with the first refrigerant leak, the second leak-prediction characteristic associated with the second interval volume and different from the first leak-prediction characteristic. The system then detects presence of the first leak-prediction characteristic in the second discharge pressure timeseries based on the second condition of the second refrigeration system by scanning the second discharge pressure timeseries, generated by the second refrigeration system, for the first leak-prediction characteristic.

In one implementation, the system: accesses a first system characteristic, of a first refrigeration system, including a first output control regime (e.g., a condenser fan proportional-integral-derivative or "PID" output control); accesses a first fill level timeseries generated a first fill level sensor in the first refrigeration system; detects a first reduction in refrigerant fill level in the first refrigeration system, during a first time window, based on the first fill level timeseries; correlates the first reduction in refrigerant fill level with a first refrigerant leak in the first refrigeration system; and identifies a first leak-prediction characteristic of a first discharge pressure timeseries correlated with the first refrigerant leak of the first refrigeration system and associated with the first output control regime.

The system similarly: accesses a second system characteristic, of a second refrigeration system, including a second output control regime (e.g., a condenser fan band-bang output control) different from the first output control regime; accesses a second fill level timeseries generated a second fill level sensor in the second refrigeration system; detects a second reduction in refrigerant fill level in the second refrigeration system, during a second time window, based on the second fill level timeseries; correlates the second reduction in refrigerant fill level with a second refrigerant leak in the second refrigeration system; and identifies a second leak-prediction characteristic of a second discharge pressure timeseries correlated with the second refrigerant leak of the second refrigeration system, associated with the second output control regime, and different from the first leak-prediction characteristic. Later, the system: accesses a third system characteristic, of a third refrigeration system, including the first output control regime (e.g., a condenser fan proportional-integral-derivative output control); accesses a third discharge pressure timeseries generated by the third refrigeration system; and, in response to identifying the third system characteristic, of the third refrigeration system, including the first output control regime, scans the third discharge pressure timeseries for the first leak-prediction characteristic. Therefore, in this implementation, the system can generate distinct leak-prediction models or define distinct leak-prediction characteristics for different control types or methods (e.g., closed-loop PID control, closed-loop PD control, or open loop control) implemented by controllers within system refrigeration systems. The system can then selectively implement these distinct leak-prediction models or define distinct leak-prediction characteristics for a particular refrigeration system based on a particular control type implemented by the particular refrigeration system.

Similarly, the system can generate distinct leak-prediction models or define distinct leak-prediction characteristics for different sensible conditions or ranges within refrigeration systems, such as: different condensing temperature ranges; different condensing pressure ranges; or different saturated condensing temperatures (e.g., calculated ranges based on condensing temperature, condensing pressure, and type of refrigerant). The system can then selectively implement these distinct leak-prediction models or define distinct leak-prediction characteristics for a particular refrigeration system based on a corresponding sensible condition detected at the particular refrigeration system.

In another implementation, the system: accesses a first system characteristic, of the first refrigeration system, that identifies an open-front configuration (i.e., that identifies the first refrigeration system as an open-front refrigeration system; accesses a second system characteristic, of the second refrigeration system, that identifies the open-front configuration; accesses a third system characteristic, of a third refrigeration system, that identifies a closed-front configuration; identifies the first leak-prediction characteristic of the first discharge pressure timeseries correlated with the first refrigerant leak, the first leak-prediction characteristic associated with the open-front configuration; accesses a third fill level timeseries generated by the third refrigeration system including a third fill level sensor; detects a third reduction in refrigerant fill level in the third refrigeration system, during a fourth time window, based on the third fill level timeseries; correlates the third reduction in refrigerant fill level with a third refrigerant leak in the third refrigeration system; accesses a third discharge pressure timeseries generated by a third pressure sensor of the third refrigeration system and concurrent with the fourth time window; and identifies a second leak-prediction characteristic of the third discharge pressure timeseries correlated with the first refrigerant leak, the second leak-prediction characteristic associated with the closed-front configuration and different from the first leak-prediction characteristic. The system then: detects presence of the first leak-prediction characteristic in the second discharge pressure timeseries by scanning the second discharge pressure timeseries, generated by the second refrigeration system, for the first leak-prediction characteristic. Therefore, in this implementation, the system can generate distinct leak-prediction models or define distinct leak-prediction characteristics for different types or configurations of refrigeration systems. The system can then selectively implement these distinct leak-prediction models or define distinct leak-prediction characteristics for a particular refrigeration system based on a particular configuration of the particular refrigeration system.

6.2 Deriving Correlations Via Machine Learning

In one implementation, the system can derive correlations between sensor data from a refrigeration system and a refrigerant leak by implementing a leak indication generator (e.g., a convolutional neural network) trained to detect refrigerant leaks based on sensor data from a refrigeration system.

For example, the system can: access a set of timeseries sensor data from a set of sensors arranged in or coupled to a refrigeration system known to exhibit a refrigerant leak; extract a set of timeseries data concurrent with incidence of the leak; and train the convolutional neural network to output a leak indication based on the set of timeseries data concurrent with incidence of the leak. Therefore, the system can input refrigeration system sensor data into a convolutional neural network to generate a leak indication defining presence or absence of a leak. The system can then: store the convolutional neural network as a leak indication generator; and implement the leak indication generator to derive a leak indication based on any set of refrigeration system sensor data.

7. CONFIDENCE SCORE

In one implementation, the system calculates a confidence score representing a likelihood that a refrigerant leak is (or is not) present. For example, the system can calculate a confidence score for a refrigerant leak based on: a count of data streams that correlate to a concurrent leak in the refrigeration system; a degree of correlation between a timeseries and the refrigerant leak; and/or a duration of time that a leak-prediction characteristic is present in the timeseries.

For example, for leak correlation via nearest-neighbor algorithms described above, the system can: calculate a distance between a vector with an unknown refrigerant leak and a vector with a known refrigerant leak (e.g., a ground truth vector or a vector correlated with a previous refrigerant leak); and derive a confidence score proportional to the distance between the vectors.

In one implementation, the system can: access a first fill level timeseries by capturing fill level data from the first refrigeration system at a first frequency; calculate a first confidence score for the first refrigerant leak; in response to the first confidence score falling below a threshold confidence range, maintain fill level data capture at the first frequency; in response to the first confidence score exceeding the threshold confidence range and falling below the leak threshold maximum, increase fill level data capture from the first frequency to a second frequency greater than the first frequency; and, in response to the first confidence score exceeding a leak threshold maximum, confirm the first refrigerant leak at first refrigeration system.

The system can further: capture discharge pressure data from the second refrigeration system at the first frequency; in response to the second confidence score falling below the threshold confidence score, maintain discharge pressure data capture at the first frequency; in response to the second confidence score exceeding the threshold confidence score and falling below the leak threshold maximum, increase discharge pressure data capture rate from the first frequency to the second frequency; and, in response to the second confidence score exceeding the leak threshold maximum, confirm the second leak at the second refrigeration system. Therefore the system can: increase a capture rate of refrigeration system data; and recalculate the confidence score based on additional data captured with the increased capture rate.

8. URGENCY

In one implementation, the system can derive an urgency of the refrigerant leak. For example, the system can populate a ground truth vector into the multi-dimensional vector space defining a high urgency corresponding to a known leak of refrigerant. For a second refrigeration system, the system populates a second vector into the multi-dimensional vector space and, in response to the second vector location proximal the ground truth vector defining the high urgency leak, the system can modify the second vector to include a high urgency.

The system can derive an urgency of the refrigerant leak based on: a time duration until the refrigerant receiver empties; a cost of repairing the leak; an amount of product stored within the refrigeration volume lost; a loss of profit due to loss of product storage volume.

In one implementation, the system correlates the first reduction in refrigerant fill level with the first refrigerant leak in the first refrigeration system by generating a first severity score quantifying a severity of the first refrigerant leak, the first severity score indicating a low leak severity of the first refrigerant leak of the first refrigeration system. The system further predicts the second refrigerant leak in the second refrigeration system during the third time window by: generating a second severity score quantifying the severity of the second refrigerant leak, the second severity score indicating a high leak severity of the second refrigerant leak of the second refrigeration system. The system can then generate an electronic notification including a prompt to prioritize repair of the second refrigeration system over the first refrigeration system, shown in FIG. 2B.

Furthermore, in another implementation, the system can: calculate a first urgency score of the first refrigerant leak; calculate a second urgency score of the second refrigerant leak exceeding the first urgency score of the first refrigerant leak; and serve a notification to the operator via the user interface including a ranked listing of refrigerant leaks displaying the second refrigerant leak ranked above the first refrigerant leak, as shown in FIG. 2A.

The system can derive an urgency score for a refrigeration system by: accessing tank geometry of the refrigerant receiver of the first refrigeration system; calculating a volumetric loss rate of refrigerant via the first refrigerant leak; predicting a time duration until the refrigerant receiver is empty based on the volumetric loss rate and the first fill level timeseries; and deriving the first urgency based on the predicted time duration.

The system can additionally or alternatively derive urgency of a refrigerant leak by: accessing a food type stored within a storage volume of the first refrigeration system; identifying a food storage temperature range of the food type; predicting a time that a temperature of the storage volume exceeds the upper bounds of the food storage temperature range; and deriving the first urgency.

9. LOCALIZATION OF A REFRIGERANT LEAK

In one implementation, the system can derive a location of the refrigerant leak. For example, the system can: prompt an operator of the refrigeration system to input a location of a refrigerant leak; add the refrigerant leak location to the vector corresponding to the refrigerant leak; and modify nearby vectors to include an indication of a possible leak location in that location.

In one implementation, the system can: access a schedule of use hours of the second refrigeration system; execute a diagnostic cycle outside of the use hours of the second refrigeration system, the diagnostic cycle. The diagnostic cycle includes: during a first diagnostic time window, activating a first compressor of the refrigeration system and deactivating a second compressor of the second refrigeration system and accessing a first timeseries of diagnostic data during the first diagnostic time window; and, during a second diagnostic time window, deactivating the first compressor and activating the second compressor and accessing a second timeseries of diagnostic data during the second diagnostic time window. The system can then detect a location of the second refrigerant leak within the second refrigeration system based on the first timeseries and the second timeseries.

In one implementation, the system can generate a repair checklist including: an identifier of a component of the second refrigeration system proximal the location of the second refrigerant leak; an identifier of a tool for repair of the component; and a prompt for the operator to confirm the location of the second refrigerant leak. Therefore the system can identify a location of the refrigerant leak and generate a repair protocol to mitigate the refrigerant leak.

10. USER INTERFACE

In one implementation, the system can host a user portal configured to render refrigeration system information for viewing by an operator of the system. The system can host a user portable accessible by an administrator, manager, operator, or associate of the refrigeration system via a computing device connected to the system.

In one implementation, system defines the user interface to include an overview of all refrigeration systems managed by the operator. The overview can include, for each system: a leak indication; a confidence score; and an urgency. The system can rank the refrigeration system in the overview based on the presence of a leak, the confidence score, or the urgency.

The system further displays notifications within the user portal as shown in FIG. 2B. For example, the system can display notifications exhibiting a threshold confidence score and urgency on the user portal. The system populates the notification with: an identifier of the refrigeration system; an urgency of the refrigerant leak; a confidence score for the refrigerant leak; a predicted financial impact of the refrigerant leak; a predicted location of the refrigerant leak; and suggested mediation actions for the refrigerant leak.

In one implementation, the system can: access timeseries pressure data from a refrigeration system; compile the timeseries pressure data into a chart representing pressure versus time; annotate the chart with a time at which a change in pressure indicates a refrigerant leak; and repeat this process for other sensor data received from the refrigeration system. The system can then access non-sensor data from the refrigeration system including a location, a case type (e.g., open front or closed front), an internal volume, a refrigerant type, a make and/or model, and a set temperature. The system then calculates: a rate of pressure change based on the timeseries of pressure data; a correlation of the rate of pressure change to a leak rate; a time until the refrigeration system runs out of refrigerant; a time until the internal volume of the refrigeration system exceeds the set temperature; and an environmental impact of the refrigerant leak. The system can calculate a priority score based on: the time until the refrigeration system runs out of refrigerant; the time until the internal volume of the refrigeration system exceeds the set temperature; and the environmental impact of the refrigerant leak.

In one implementation, the system can then: render charts (e.g., sensor data timeseries over time) for the refrigeration system in user portal; repeat the process above for a population of refrigeration systems (e.g., a set of refrigeration system within one building, on one campus, or associated with/owned by a single organization); rank refrigeration systems in population by the leak rate, the time until the refrigeration system runs out of refrigerant, and environmental impact; and generates a table representing all refrigeration systems, including refrigeration system characteristics and derived leakage-related data, the table sortable by the priority score and other parameters.

11. CONCLUSION

As a person skilled in the art will recognize from the previous detailed description and from the figures and claims, modifications and changes can be made to the embodiments of the invention without departing from the scope of this invention as defined in the following claims.

We claim:

1. A method comprising:
   during a first time period:
   accessing a first fill level timeseries output by a first refrigeration system comprising a fill level sensor configured to output a signal representing a fill level of a refrigerant receiver;
   detecting a first reduction in refrigerant fill level in the first refrigeration system, during a first time window, based on the first fill level timeseries;
   correlating the first reduction in refrigerant fill level with a first refrigerant leak in the first refrigeration system;
   accessing a first discharge pressure timeseries:
      output by a pressure sensor of the first refrigeration system; and
      concurrent with the first time window; and
   identifying a first leak-prediction characteristic of the first discharge pressure timeseries correlated with the first refrigerant leak;
   during a second time period succeeding the first time period:
   accessing a second discharge pressure timeseries output by a second pressure sensor of a second refrigeration system during a second time window, the second refrigeration system excluding fill level sensors;
   detecting absence of the first leak-prediction characteristic in the second discharge pressure timeseries; and
   in response to detecting absence of the first leak-prediction characteristic in the second discharge pressure timeseries:
      predicting absence of refrigerant leaks in the second refrigeration system during the second time window; and
   during a third time period succeeding the first time period:
   accessing a third discharge pressure timeseries output by the second refrigeration system during a third time window;
   detecting presence of the first leak-prediction characteristic in the third discharge pressure timeseries; and
   in response to detecting presence of the first leak-prediction characteristic in the third discharge pressure timeseries:
      predicting a second refrigerant leak in the second refrigeration system during the third time window;
      generating an electronic notification indicating detection of the second refrigerant leak in the second refrigeration system during the third time window; and
      transmitting the electronic notification to a mobile device associated with an operator affiliated with the second refrigeration system.

2. The method of claim 1:
   wherein identifying the first leak-prediction characteristic comprises;
      extracting the first leak-prediction characteristic from the first discharge pressure timeseries, the first leak-prediction characteristic representing pressurizing durations changing from a first duration to a second duration exceeding the first duration by more than a threshold difference;
   wherein detecting absence of the first leak-prediction characteristic in the second discharge pressure timeseries comprises:
      detecting absence of the first leak-prediction characteristic in the second discharge pressure timeseries based on the second discharge pressure timeseries exhibiting pressurizing durations differing by less than the threshold difference; and
   wherein detecting presence of the first leak-prediction characteristic in the third discharge pressure timeseries comprises:
      detecting presence of the first leak-prediction characteristic in the third discharge pressure timeseries based on the third discharge pressure timeseries exhibiting pressurizing durations increasing by more than the threshold difference.

3. The method of claim 1:
   further comprising, via the first refrigeration system, streaming the fill levels and discharge pressures to a remote computer system;
   wherein accessing the first discharge pressure timeseries comprises:
      at the remote computer system, writing discharge pressures, streamed from the first refrigeration system, to a circular buffer spanning a time duration of multiple weeks; and
      in response to correlating the first reduction in refrigerant fill level with the first refrigerant leak in the first refrigeration system;
         detecting a first leak start time of the first refrigerant leak based on the first fill level timeseries;
         retrieving the first discharge pressure timeseries from the circular buffer;
         identifying a segment of the first discharge pressure timeseries comprising discharge pressures recorded proximal the first leak start time; and
         extracting a leak-prediction characteristic from the segment of the first discharge pressure timeseries; and
   wherein identifying the first leak-prediction characteristic comprises identifying the first leak-prediction characteristic of the first discharge pressure timeseries temporally correlated with the first refrigerant leak based on the first leak start time and discharge pressures recorded proximal the first leak start time.

4. The method of claim 1:
wherein accessing the first fill level timeseries comprises:
for a first duration within the first time period, triggering the fill level sensor of the first refrigeration system to capture fill levels from the first refrigeration system at a first frequency;
further comprising, during the first time period:
calculating a first confidence score for the first refrigerant leak based on fill levels in the first fill level timeseries;
in response to the first confidence score falling below a threshold confidence range, triggering the fill level sensor of the first refrigeration system to capture fill levels from the first refrigeration system at the first frequency for a second duration within the first time period succeeding the first duration; and
in response to the first confidence score falling within a threshold confidence range, triggering the fill level sensor of the first refrigeration system to capture fill levels at a second frequency greater than the first frequency;
wherein correlating the first reduction in refrigerant fill level with the first refrigerant leak in the first refrigeration system comprises:
in response to the first confidence score exceeding the threshold confidence range, confirming presence of the first refrigerant leak at the first refrigeration system; and
wherein accessing the second discharge pressure timeseries comprises:
for a second duration within the second time period, triggering the second pressure sensor of the second refrigeration system to capture discharge pressure data from the second refrigeration system at the first frequency;
in response to the second confidence score falling below the threshold confidence range, maintaining discharge pressure data capture at the first frequency;
in response to the second confidence score exceeding the threshold confidence range and falling below the leak threshold maximum, increasing discharge pressure data capture from the first frequency to the second frequency; and
in response to the second confidence score exceeding the leak threshold maximum, confirming the second leak at the second refrigeration system.

5. The method of claim 1:
wherein identifying the first leak-prediction characteristic of the first discharge pressure timeseries correlated with the first refrigerant leak comprises:
deriving a first correlation between the first leak-prediction characteristic represented in the first discharge pressure timeseries and the first refrigerant leak;
further comprising:
accessing a third fill level timeseries output by a third refrigeration system comprising a fill level sensor;
detecting a third reduction in refrigerant fill level in the third refrigeration system, during a fourth time window, based on the third fill level timeseries;
correlating the third reduction in refrigerant fill level with a third refrigerant leak in the third refrigeration system;
accessing a third discharge pressure timeseries:
output by a pressure sensor of the third refrigeration system; and
concurrent with the fourth time window;
deriving a second correlation between a third leak-prediction characteristic represented in the third discharge pressure timeseries and the third refrigerant leak; and
generating a composite correlation based on the first correlation and the second correlation; and
wherein predicting the second refrigerant leak in the second refrigeration system comprises predicting the second refrigerant leak in the second refrigeration system based on the composite correlation and the third discharge pressure timeseries.

6. The method of claim 1:
further comprising:
accessing a first system characteristic, of the first refrigeration system, identifying a first refrigerant type loaded into the first refrigeration system;
accessing a second system characteristic, of the second refrigeration system, identifying the first refrigerant type loaded into the second refrigeration system; and
accessing a third system characteristic, of a third refrigeration system, identifying a second refrigerant type loaded into the third refrigeration system;
wherein identifying the first leak-prediction characteristic of the first discharge pressure timeseries correlated with the first refrigerant leak comprises:
identifying the first leak-prediction characteristic of the first discharge pressure timeseries correlated with the first refrigerant leak, the first leak-prediction characteristic associated with the first refrigerant type;
further comprising:
accessing a third fill level timeseries output by the third refrigeration system comprising a third fill level sensor;
detecting a third reduction in refrigerant fill level in the third refrigeration system, during a fourth time window, based on the third fill level timeseries;
correlating the third reduction in refrigerant fill level with a third refrigerant leak in the third refrigeration system;
accessing a third discharge pressure timeseries:
output by a third pressure sensor of the third refrigeration system; and
concurrent with the fourth time window; and
identifying a second leak-prediction characteristic of the third discharge pressure timeseries correlated with the first refrigerant leak, the second leak-prediction characteristic associated with the second refrigerant type and different from the first leak-prediction characteristic; and
wherein detecting presence of the first leak-prediction characteristic in the second discharge pressure timeseries comprises:
based on the second system characteristic of the second refrigeration system:
scanning the second discharge pressure timeseries, generated by the second refrigeration system, for the first leak-prediction characteristic.

7. The method of claim 1:
further comprising:
accessing a first system characteristic, of the first refrigeration system, identifying a first geographic region;
accessing a second system characteristic, of the second refrigeration system, identifying the first geographic region; and
accessing a third system characteristic, of a third refrigeration system, identifying a second geographic region;

wherein identifying the first leak-prediction characteristic
of the first discharge pressure timeseries correlated with
the first refrigerant leak comprises:
identifying the first leak-prediction characteristic of the
first discharge pressure timeseries correlated with the
first refrigerant leak, the first leak-prediction characteristic associated with the first geographic region;
further comprising:
accessing a third fill level timeseries output by the third
refrigeration system comprising a third fill level
sensor;
detecting a third reduction in refrigerant fill level in the
third refrigeration system, during a fourth time window, based on the third fill level timeseries;
correlating the third reduction in refrigerant fill level
with a third refrigerant leak in the third refrigeration
system;
accessing a third discharge pressure timeseries:
output by a third pressure sensor of the third refrigeration system; and
concurrent with the fourth time window; and
identifying a second leak-prediction characteristic of
the third discharge pressure timeseries correlated
with the first refrigerant leak, the second leak-prediction characteristic associated with the second geographic region and different from the first leak-prediction characteristic; and
wherein detecting presence of the first leak-prediction
characteristic in the second discharge pressure timeseries comprises:
based on the second system characteristic of the second
refrigeration system:
scanning the second discharge pressure timeseries,
generated by the second refrigeration system, for
the first leak-prediction characteristic.

8. The method of claim 1:
further comprising:
accessing a first system characteristic, of the first refrigeration system, comprising a first output control
regime;
wherein identifying the first leak-prediction characteristic
of the first discharge pressure timeseries comprises:
identifying the first leak-prediction characteristic of the
first discharge pressure timeseries correlated with the
first refrigerant leak and associated with the first
output control regime;
further comprising:
accessing a third system characteristic, of a third refrigeration system, comprising a second output control
regime;
accessing a third fill level timeseries generated by the
third refrigeration system comprising a third fill level
sensor;
detecting a third reduction in refrigerant fill level in the
third refrigeration system, during a fourth time window, based on the third fill level timeseries;
correlating the third reduction in refrigerant fill level
with a third refrigerant leak in the third refrigeration
system;
accessing a third discharge pressure timeseries:
generated by a third pressure sensor of the third
refrigeration system; and
concurrent with the fourth time window; and
identifying a second leak-prediction characteristic of
the third discharge pressure timeseries correlated
with the first refrigerant leak, associated with the
second output control regime, and different from the
first leak-prediction characteristic;
further comprising accessing a second system characteristic, of the second refrigeration system, comprising the
first output control regime; and
wherein detecting presence of the first leak-prediction
characteristic in the second discharge pressure timeseries comprises:
in response to detecting the second system characteristic, of the second refrigeration system, comprising
the first output control regime:
scanning the second discharge pressure timeseries,
generated by the second refrigeration system, for
the first leak-prediction characteristic.

9. The method of claim 1:
further comprising:
accessing a first system characteristic of the first refrigeration system identifying an open-front configuration;
wherein identifying the first leak-prediction characteristic
of the first discharge pressure timeseries correlated with
the first refrigerant leak comprises:
identifying the first leak-prediction characteristic of the
first discharge pressure timeseries correlated with the
first refrigerant leak, the first leak-prediction characteristic associated with the open-front configuration;
further comprising:
accessing a third system characteristic of a third refrigeration system identifying a closed-front configuration;
accessing a third fill level timeseries generated by the
third refrigeration system comprising a third fill level
sensor;
detecting a third reduction in refrigerant fill level in the
third refrigeration system, during a fourth time window, based on the third fill level timeseries;
correlating the third reduction in refrigerant fill level
with a third refrigerant leak in the third refrigeration
system;
accessing a third discharge pressure timeseries:
generated by a third pressure sensor of the third
refrigeration system; and
concurrent with the fourth time window; and
identifying a second leak-prediction characteristic of
the third discharge pressure timeseries correlated
with the first refrigerant leak, the second leak-prediction characteristic associated with the closed-front configuration and different from the first leak-prediction characteristic; and
further comprising accessing a second system characteristic of the second refrigeration system identifying the
open-front configuration; and
wherein detecting presence of the first leak-prediction
characteristic in the second discharge pressure timeseries comprises:
in response to the second system characteristic of the
second refrigeration system identifying the open-front configuration:
scanning the second discharge pressure timeseries,
generated by the second refrigeration system, for
the first leak-prediction characteristic.

10. The method of claim 1:
wherein correlating the first reduction in refrigerant fill
level with the first refrigerant leak in the first refrigeration system comprises:

deriving a first severity score characterizing severity of the first refrigerant leak at the first refrigeration system during the first time window proportional to a first rate of change of the first reduction in fill level; and deriving a first correlation between a second rate of change of the first leak-prediction characteristic with severity of the first refrigerant leak;

wherein predicting the second refrigerant leak in the second refrigeration system during the third time window comprises:
deriving a second severity score quantifying severity of the second refrigerant leak, at the second refrigeration system during the third time window, proportional to the first correlation; and wherein generating the electronic notification identifying the second refrigerant leak in the second refrigeration system comprises:
calculating a critical time until second refrigeration system failure based on the second severity score; and
generating the electronic notification indicating a prompt to repair the second refrigeration system before the critical time.

11. The method of claim 1, further comprising:
estimating a first refrigerant leak rate from the first refrigeration system based on the first fill level timeseries;
deriving a correlation between the first leak-prediction characteristic and the first refrigerant leak rate;
estimating a second refrigerant leak rate based on the correlation and the third discharge pressure timeseries;
accessing a system characteristic, of the second refrigeration system, identifying a refrigerant volume within the second refrigeration system; and
estimating a time duration to critical refrigerant volume loss at the second refrigeration system based on the refrigerant volume and second refrigerant leak rate.

12. The method of claim 1, further comprising:
accessing a schedule of use hours of the second refrigeration system;
defining a diagnostic cycle comprising:
during a first diagnostic time window:
triggering activation of a first compressor of the refrigeration system;
triggering deactivation of a second compressor of the second refrigeration system; and
accessing a first timeseries of discharge pressures during the first diagnostic time window; and
during a second diagnostic time window:
triggering deactivation of the first compressor;
triggering activation of the second compressor; and
accessing a second timeseries of discharge during the second diagnostic time window;
triggering the second refrigeration system to execute the diagnostic cycle outside of the use hours of the second refrigeration system;
identifying the second compressor as a location of the second refrigerant leak based on the first timeseries of discharge pressures and the second timeseries of discharge pressures;
wherein accessing the third discharge pressure timeseries generated by the second refrigeration system during the third time window comprises:
accessing the third discharge pressure timeseries generated by the second refrigeration system during the second diagnostic time window; and wherein predicting the second refrigerant leak in the second refrigeration system during the third time window comprises:
predicting the second refrigerant leak at the second compressor in the second refrigeration system during the second diagnostic time window.

13. The method of claim 12:
wherein generating the electronic notification comprises:
generating a repair instruction based on the location of the second refrigerant leak, the repair instruction comprising:
a first identifier of a second compressor of the second refrigeration system associated with the second refrigerant leak;
a second identifier of a tool for repair of the component; and
a prompt for the operator to confirm the location of the second refrigerant leak.

14. The method of claim 1:
wherein identifying the first leak-prediction characteristic of the first discharge pressure timeseries correlated with the first refrigerant leak comprises:
deriving a first characteristic of the first discharge pressure timeseries;
accessing a nominal characteristic, corresponding to the first characteristic, of a nominal discharge pressure timeseries defined for the first refrigeration system;
characterizing a difference between the first characteristic and the nominal characteristic; and
in response to the difference exceeding a threshold difference, defining the first characteristic as the first leak-prediction characteristic.

15. The method of claim 1, wherein accessing the first fill level timeseries comprises:
at the first refrigeration system:
capturing the first fill level timeseries via the fill level sensor; and
transmitting the first fill level timeseries to a remote computer system; and
at the remote computer system, receiving the first fill level timeseries from the first refrigeration system.

16. The method of claim 1:
further comprising:
accessing a second fill level timeseries output by a third refrigeration system comprising a second fill level sensor;
detecting a second reduction in refrigerant fill level in the third refrigeration system, during a fourth time window, based on the second fill level timeseries;
correlating the second reduction in refrigerant fill level with a third refrigerant leak in the third refrigeration system;
accessing a fourth discharge pressure timeseries:
output by a third pressure sensor of the third refrigeration system; and
concurrent with the fourth time window;
identifying a second leak-prediction characteristic of the fourth discharge pressure timeseries correlated with the third refrigerant leak; and
compiling the first leak-prediction characteristic and the second leak-prediction characteristic into a leak-prediction model;
wherein detecting absence of the first leak-prediction characteristic in the second discharge pressure timeseries comprises detecting absence of the first leak-prediction characteristic in the second discharge pressure timeseries based on the leak-prediction model;

wherein predicting absence of refrigerant leaks in the second refrigeration system in response to detecting absence of the first leak-prediction characteristic comprises:
  in response to detecting absence of the first leak-prediction characteristic and the second leak-prediction characteristic in the second discharge pressure timeseries, predicting absence of refrigerant leaks in the second refrigeration system; and wherein detecting presence of the first leak-prediction characteristic in the third discharge pressure timeseries comprises detecting presence of the second leak-prediction characteristic in the third discharge pressure timeseries based on the leak-prediction model.

17. A method comprising:
during a first time period:
  accessing a first timeseries output by a first sensor of a first sensor type and integrated within a first refrigeration system;
  detecting a first change in the first refrigeration system, during a first time window, based on the first timeseries;
  correlating the first change in the first refrigeration system with a first refrigerant leak in the first refrigeration system;
  accessing a second timeseries generated by a second sensor of a second sensor type and integrated within the first refrigeration system, the second timeseries concurrent with the first time window; and
  identifying a first leak-prediction characteristic of the second timeseries correlated with the first refrigerant leak;
during a second time period succeeding the first time period:
  accessing a third timeseries generated by a third sensor of the second sensor type and integrated within a second refrigeration system excluding the first sensor type, the third timeseries output during a second time window; and
  in response to detecting absence of the first leak-prediction characteristic in the third timeseries:
    predicting absence of refrigerant leaks in the second refrigeration system during the second time window; and
during a third time period succeeding the first time period:
  accessing a fourth timeseries output by the third sensor of the second refrigeration system during a third time window; and
  in response to detecting presence of the first leak-prediction characteristic in the fourth timeseries:
    predicting a second refrigerant leak in the second refrigeration system during the third time window;
    generating an electronic notification identifying the second refrigerant leak in the second refrigeration system; and
    transmitting the electronic notification to a mobile device associated with an operator affiliated with the second refrigeration system.

18. The method of claim 17:
wherein accessing the first timeseries generated by the first sensor of the first refrigeration system defining the first sensor type comprises:
  accessing a first fill level timeseries generated by a first refrigeration system comprising a fill level sensor configured to output a signal representing a fill level of a refrigerant receiver;
wherein detecting the first change in the first refrigeration system comprises:
  detecting a first reduction in refrigerant fill level in the first refrigeration system, during a first time window, based on the first fill level timeseries;
wherein accessing a second timeseries generated by a second sensor of the first refrigeration system comprises:
  accessing a first power consumption timeseries generated by a power meter of the first refrigeration system; and
wherein accessing a third timeseries generated by third sensor defining the second sensor type of a second refrigeration system comprises:
  accessing a second power consumption timeseries generated by the power meter of the second refrigeration system.

19. The method of claim 17:
wherein correlating the first change in the first refrigeration system with a first refrigerant leak in the first refrigeration system comprises:
  deriving a first severity score characterizing severity of the first refrigerant leak at the first refrigeration system during the first time window proportional to a first rate of change of the first timeseries;
wherein predicting the second refrigerant leak in the second refrigeration system during the third time window comprises:
  deriving a second severity score quantifying severity of the second refrigerant leak, at the second refrigeration system during the third time window proportional to a second rate of change of the third timeseries; and
wherein generating an electronic notification identifying the second refrigerant leak in the second refrigeration system comprises:
  generating a priority ranking of repairing a population of refrigeration systems comprising the second refrigeration system, the priority ranking based on the severity score of each refrigerant leak of each refrigeration system; and
  generating the electronic notification including the priority ranking.

\* \* \* \* \*